July 2, 1940.   C. S. ASH   2,206,216
DUAL WHEEL VEHICLE
Filed March 1, 1939
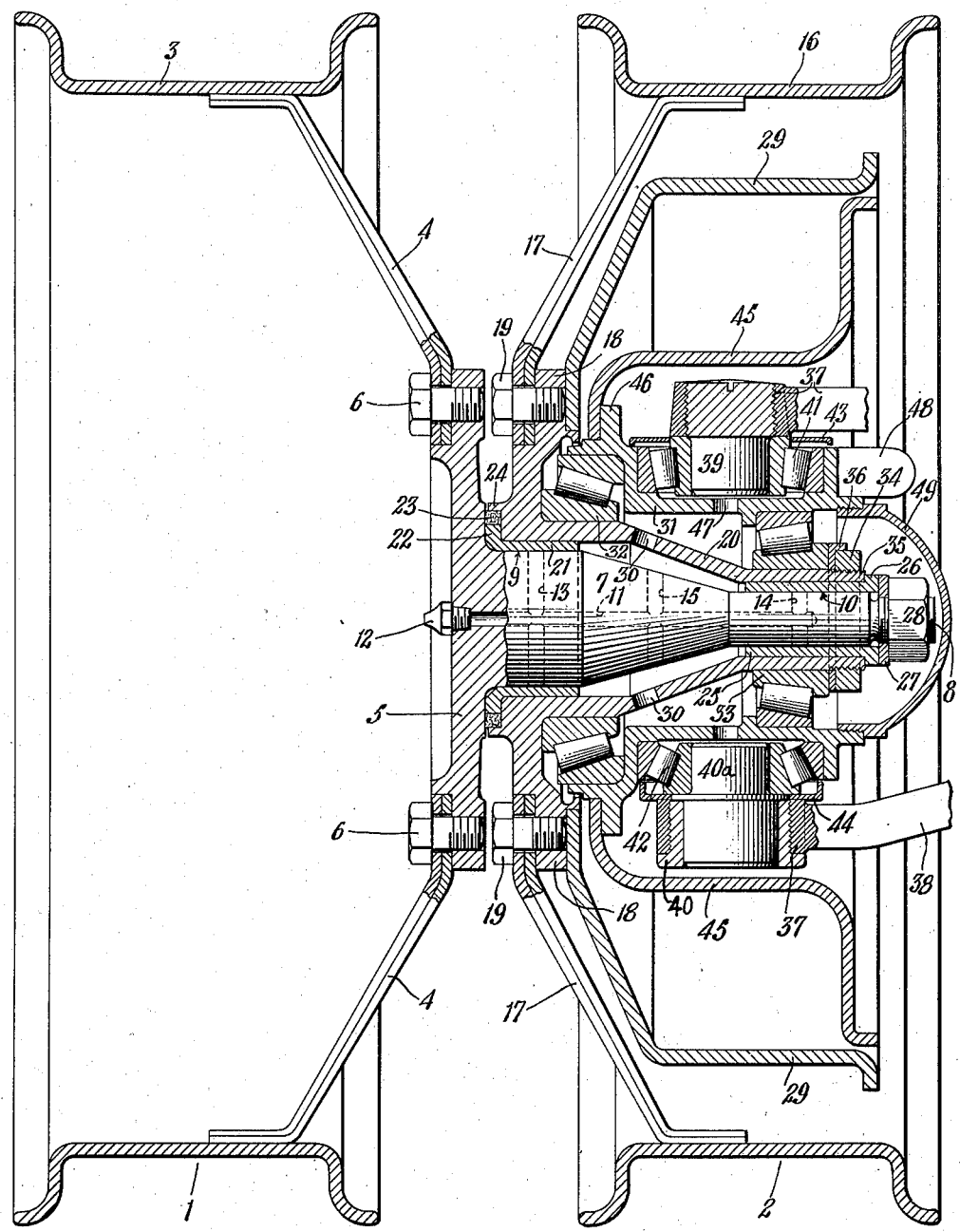
INVENTOR
C. S. Ash.
BY
Morgan Finnegan and Durham
ATTORNEY Patented July 2, 1940

2,206,216

UNITED STATES PATENT OFFICE 2,206,216

DUAL WHEEL VEHICLE

Charles S. Ash, Milford, Mich.

Application March 1, 1939, Serial No. 259,096

5 Claims. (Cl. 280—96.1)

My invention relates to wheeled vehicles and more particularly to improvements in wheel gear therefor.

An object of my invention is to provide a wheel gear embodying a dual wheel assembly which is of lighter weight than wheel gear embodying a dual wheel assembly of equal load carrying capacity heretofore employed.

Another object of my invention is to provide a dual wheel assembly having relatively rotatable wheels which is more easily removable as a unit from its supporting member than dual wheel assemblies of equal load carrying capacity heretofore employed.

Another object of my invention is to provide a vehicle wheeled gear embodying a pivotally mounted dual wheel assembly having relatively rotatable wheels which will enable lubrication of the assembly bearings and assembly support bearings to be performed in a single operation.

Another object of my invention is to provide in a wheeled vehicle, a dirigible wheeled gear embodying a dual wheel assembly which is novel and of great commercial utility.

Other and further objects of my invention will appear from the accompanying drawing, the following description and the appended claims.

The accompanying drawing which forms part of the instant specification and is to be read in conjunction therewith is a part sectional view in elevation of a preferred embodiment of my invention.

In general, I achieve the objects of my invention through the provision of a dual wheel assembly in which the hubs of the respective wheels are each formed with a spindle, one of which is hollow so that the other may be received therein in telescoped relation.

The spindles are locked together to prevent relative axial movement, though relative rotation of the respective wheels on bearings positioned between the spindles is possible.

The wheel assembly is rotatably supported by a hollow journal member pivotally supported upon a suitable frame member, for example, an axle of the vehicle.

The rotatable support between the journal member and the wheel assembly is accomplished by a pair of rotary bearings positioned between the journal member and the hollow spindle. Thus, the spindles and journal member are in telescoped relation, the spindles being fixed against axle displacement relative to the journal member by means of the rotary bearings and locking means engaging the outer spindle and one of said bearings.

Lubrication of bearings between the vehicle frame member and the journals, between the journal member and the outer spindle, and between the spindles, is easily effected through the suitably positioned ports in the journal member, in the outer spindle and in the inner spindle which communicate with each other and with a passage in the inner spindle through which lubricant may be supplied under pressure.

Referring now more particularly to the accompanying drawing, I have shown a wheel gear embodying a dual wheel assembly comprising wheels 1 and 2 respectively.

The wheel 1 is provided with a rim 3 which is, as shown, of the straight side type adapted to be equipped with a pneumatic tire. The rim 3 is welded or otherwise fixedly secured to one end of spokes 4 whose respective opposite ends are removably fastened to a wheel hub 5 by means of bolts 6.

The wheel hub 5 is provided with a spindle 7 having a threaded end portion 8 and bearing surfaces 9 and 10 of respectively smaller diameters. There is also formed in the spindle a passage 11 from which lubricant supplied thereto through a pressure fitting 12 may be caused to flow through passages 13 and 14 to the bearing surfaces 9 and 10 respectively and through a passage 15 to the spindle periphery between the bearing surfaces.

The wheel 2 comprises a rim 16 of the straight side type which is adapted to carry a pneumatic tire. The rim 16 is welded or otherwise fixedly secured to spokes 17 whose respective opposite ends are removably fastened to a wheel hub 18 by means of bolts 19.

The wheel hub 18 is provided with a hollow spindle 20 within which the spindle 7 is telescoped.

A bearing member 21 of bronze or other suitable bearing metal is positioned between the outer spindle 20 and the bearing surface 9 of the inner spindle. An annular flange 22 extends outwardly from the bearing member 21 between the hubs 5 and 18 and serves to maintain these hubs in spaced relation. An oil ring 23 of felt, leather, or other suitable oil sealing material is provided in the space between the hubs 5 and 18 and is held in position by means of an annular flange 24 on the hub 18.

A bearing member 25 of bronze or other suitable bearing metal is positioned between the outer spindle 20 and the bearing surface 10 of the inner spindle 7. The bearing member 25 is snugly fitted within the spindle 20 as by a driving fit so that relative rotation between the spindle 20 and the bearing member 25 will not normally occur. Obviously, however, the bearing member 25 may be keyed within the spindle 20 or otherwise suitably fastened thereto so that relative rotation will not occur. An annular flange 26 extending outwardly from the bearing member 25 is clamped between the end of the outer spindle 20 and a washer 27 by means of a nut 28 on the threaded portion 8 of the spindle 7. Thus, it will be observed that the spindles 7 and 20 are locked against axial displacement, but may, nevertheless, rotate relative to each other.

A brake drum 29 is affixed to the hub 18 in any suitable manner and spindle 20 is provided with ports 30 through which lubricant may flow, for a purpose to be hereinafter described. The dual wheel assembly is rotatably supported by a hollow journal member 31 within which telescoped spindles 7 and 20 are received and supported for rotation by means of spaced apart rotary bearings 32 and 33, which function as thrust bearings as well.

Axial displacement between the journal member 31 and the outer spindle 20 is prevented in one direction by the bearing 32 co-operating with the journal member 31 and the hub 18. Axial displacement between the journal member 31 and the outer spindle 20 in the other direction is prevented by the bearing 33 co-operating with the journal 31 and a lock nut 34 carried on a threaded end portion 35 of the outer spindle 20. A lock washer 36 is preferably provided between the nut 34 and the bearing 33. Thus, it will be observed that while the journal member 31, spindle 7 and spindle 20 are relatively rotatable, there can be no axial movement therebetween.

The journal member 31 is pivotally mounted on the apertured ends 37 of the bifurcated axle yoke 38 at the ends of the front axle, and may pivot about a substantially vertical axis.

The upper portion of the bifurcated axle end member 38 is threaded to receive the downwardly extending stub 39 while the lower portion of the bifurcated member 38 is holed through and fitted with a threaded and flanged boss 40 removable therefrom, which serves to secure the upwardly extending stub 40a in place.

The journal member 31 is pivotally mounted on these bosses by means of spaced apart and vertically alined rotary bearings 41 and 42 respectively capped by suitable oil retaining rings 43 and 44, respectively.

Suitable brake mechanism (not shown) may be mounted on a member 45 which may be bolted, welded or otherwise suitably secured to an annular flange 46 on the journal member 31.

Ports 47 in the journal member 31 permit lubricant to flow directly to the bearings 41 and 42.

A steering arm 48 for turning the journal member 31 may be connected in any suitable manner with steering gear (not shown) and a hub cap 49 is threadedly received within the journal member 31 as shown.

It will be observed that even when the wheel 2 is braked, the braking effort is not transferred to the wheel 1 which may turn relatively to the wheel 2. It will be observed further that the stubs 39 and 40 have a common axis lying in a plane which intersects the road surface between the intersection of the medial planes of the respective wheels with the road surface. Thus the ease with which a vehicle may be steered is facilitated.

It will be seen that I have accomplished the objects of my invention and I have provided wheel gear in which all bearing surfaces may be lubricated by a single operation. I have provided wheel gear embodying a dual wheel assembly having relatively rotatable wheels from which the outer wheel or both wheels may be removed in a simple and expeditious manner. I have provided wheel gear which is readily accessible for inspection and repair and in which the size of parts has been appreciably reduced without sacrifice of load carrying capacity.

It will be observed that certain features and sub-combinations are of utility and may be employed without reference to other features and sub-combinations. This is contemplated by and is within the scope of the appended claims. It is further obvious that various changes may be made in details within the scope of the appended claims without departing from the spirit of this invention. It is, therefore, to be understood that this invention is not to be limited to the specific details shown and described.

Having thus described the invention, what is claimed is:

1. A wheel assembly comprising, in combination, wheel hubs; respective spindles extending from said hubs; said spindles being in telescoped journalled relation; and, a member within which the outermost of said spindles is journalled for rotation relative thereto.

2. A wheel assembly comprising, in combination, wheel hubs; respective spindles extending from said hubs, said spindles being in telescoped journalled relation; and, a swivelled member within which the outermost of said spindles is journalled for rotation relative thereto.

3. A wheel assembly comprising, in combination, wheel hubs; respective spindles extending from said hubs in telescoped relation; means including bearing means for maintaining said spindles in fixed axial relationship while enabling said spindles to rotate relative to each other; a swiveled member positioned about said spindles; and, means forming a rotary bearing between said member and the outermost of said spindles.

4. In a vehicle, the combination of a member; wheel hubs; respective spindles extending from said hubs in telescoped relation; means including bearing means for maintaining said spindles in fixed axial relationship while enabling said spindles to rotate relative to each other; a journal member positioned about said spindles and pivotally mounted on said first mentioned member; and, means forming a rotary bearing between said journal member and the outermost of said spindles.

5. A vehicle wheel assembly comprising, in combination, an outer wheel hub having an axially projecting spindle; an inner wheel hub having a hollow axially projecting spindle telescoped over said first mentioned spindle; means for locking said spindles in fixed axial relationship; bearing means between said spindles; a hollow journal member encompassing said outer spindle; rotary bearings positioned between said outer spindle and said journal member; and, means to mount said journal member for turning about an axis passing between the respective medial planes of said wheels.

CHARLES S. ASH.